US009330349B2

(12) United States Patent
Cogan

(10) Patent No.: US 9,330,349 B2
(45) Date of Patent: May 3, 2016

(54) SYSTEMS AND METHODS FOR PROVIDING VARIABLE DATA PRINTING (VDP) USING DYNAMIC FONT DOWNGRADING

(71) Applicant: Printable Technologies, Inc., Solana Beach, CA (US)

(72) Inventor: Douglas Neal Cogan, Brookfield, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 0 days.

(21) Appl. No.: 14/269,802

(22) Filed: May 5, 2014

(65) Prior Publication Data

US 2014/0240731 A1 Aug. 28, 2014

Related U.S. Application Data

(63) Continuation of application No. 12/571,387, filed on Sep. 30, 2009, now Pat. No. 8,717,596.

(51) Int. Cl.
*G06F 3/12* (2006.01)
*G06F 15/00* (2006.01)
*G06K 1/00* (2006.01)
*G06K 15/00* (2006.01)
*H04N 1/409* (2006.01)
*H04N 1/23* (2006.01)
*G06K 15/02* (2006.01)

(52) U.S. Cl.
CPC .......... *G06K 15/1802* (2013.01); *G06F 3/1204* (2013.01); *G06F 3/1225* (2013.01); *G06F 3/1243* (2013.01); *G06F 3/1286* (2013.01); *G06F 3/1287* (2013.01); *G06F 3/1288* (2013.01); *G06F 3/1208* (2013.01)

(58) Field of Classification Search
CPC . G06F 17/243; G06F 17/30011; G06F 17/24; G06F 17/30

USPC ................ 358/1.15, 1.9, 1.14, 1.13; 713/150; 348/231.4
See application file for complete search history.

(56) References Cited

U.S. PATENT DOCUMENTS

| | | | |
|---|---|---|---|
| 4,839,829 A | 6/1989 | Freedman | |
| 4,850,028 A | 7/1989 | Kawamura et al. | |
| 5,367,619 A | 11/1994 | Dipaolo et al. | |
| 5,586,241 A * | 12/1996 | Bauermeister | ........ G06T 11/203 345/170 |

(Continued)

FOREIGN PATENT DOCUMENTS

| | | |
|---|---|---|
| EP | 778535 | 6/1997 |
| EP | 1014255 | 6/2000 |
| EP | 1026876 | 8/2000 |
| EP | 1031916 | 8/2000 |
| EP | 1471460 | 10/2004 |

(Continued)

OTHER PUBLICATIONS

Aberdeen Group Review: "NovaSoft," Aberdeen Grobp Review, 'Online!—Jul. 1, 1997, XP002090204, Retrieved from the Internet: <URL:Available on-line in 1997>.

(Continued)

*Primary Examiner* — Akwasi M Sarpong
(74) *Attorney, Agent, or Firm* — Cooley LLP

(57) ABSTRACT

Apparatus and methods for providing downgraded fonts for VDP printing application are described. A server system may be configured to generate and/or select a set of downgraded rasterized fonts for delivery to a client system in order to provide limited client-side WYSIWIG display functionality using the downgraded fonts. A client side application may use the downgraded fonts to provide a display-only or draft print only rendering of a VDP print job.

19 Claims, 9 Drawing Sheets

(56) References Cited

U.S. PATENT DOCUMENTS

| | | | |
|---|---|---|---|
| 5,694,551 A | 12/1997 | Doyle et al. | |
| 5,745,712 A | 4/1998 | Turpin et al. | |
| 5,758,126 A | 5/1998 | Daniels et al. | |
| 5,758,327 A | 5/1998 | Gardner et al. | |
| 5,765,138 A | 6/1998 | Aycock et al. | |
| 5,781,714 A * | 7/1998 | Collins | G06F 17/214 345/471 |
| 5,842,178 A | 11/1998 | Giovannoli | |
| 5,884,014 A | 3/1999 | Huttenlocher et al. | |
| 5,911,141 A | 6/1999 | Kelley et al. | |
| 5,911,143 A | 6/1999 | Deinhart et al. | |
| 5,963,939 A | 10/1999 | McCann et al. | |
| 6,018,774 A | 1/2000 | Mayle et al. | |
| 6,043,826 A | 3/2000 | Manning | |
| 6,055,522 A | 4/2000 | Krishna et al. | |
| 6,067,548 A | 5/2000 | Cheng | |
| 6,073,147 A * | 6/2000 | Chan | G06F 17/214 345/467 |
| 6,092,050 A | 7/2000 | Lungren et al. | |
| 6,161,146 A | 12/2000 | Kley et al. | |
| 6,182,078 B1 | 1/2001 | Whitmyer, Jr. | |
| 6,199,079 B1 | 3/2001 | Gupta et al. | |
| 6,205,452 B1 | 3/2001 | Warmus et al. | |
| 6,226,656 B1 | 5/2001 | Zawadzki et al. | |
| 6,236,409 B1 | 5/2001 | Hartman | |
| 6,308,164 B1 | 10/2001 | Nummelin et al. | |
| 6,327,599 B1 | 12/2001 | Warmus et al. | |
| 6,356,268 B1 * | 3/2002 | Beaman | G06F 17/214 345/467 |
| 6,449,053 B2 | 9/2002 | Bando | |
| 6,460,072 B1 | 10/2002 | Arnold et al. | |
| 6,462,756 B1 | 10/2002 | Hansen et al. | |
| 6,498,608 B1 * | 12/2002 | Dresevic | G06F 17/214 345/467 |
| 6,529,214 B1 | 3/2003 | Chase et al. | |
| 6,583,887 B1 | 6/2003 | Clouthier et al. | |
| 6,615,188 B1 | 9/2003 | Breen et al. | |
| 6,615,234 B1 | 9/2003 | Adamske et al. | |
| 6,650,433 B1 | 11/2003 | Keane et al. | |
| 6,826,727 B1 | 11/2004 | Mohr et al. | |
| 6,839,149 B2 | 1/2005 | Herr | |
| 6,919,967 B1 * | 7/2005 | Pentecost | G06F 17/212 235/375 |
| 6,986,105 B2 | 1/2006 | Walker, Jr. | |
| 7,117,504 B2 | 10/2006 | Smith et al. | |
| 7,120,634 B2 | 10/2006 | Jecha et al. | |
| 7,133,050 B2 | 11/2006 | Schowtka | |
| 7,145,670 B2 | 12/2006 | Keane et al. | |
| 7,268,912 B2 | 9/2007 | Murata | |
| 7,298,516 B2 | 11/2007 | Herr | |
| 7,300,044 B2 * | 11/2007 | Stemmle | G06Q 30/02 270/1.01 |
| 7,375,842 B2 * | 5/2008 | Kloosterman | G06K 15/02 358/1.1 |
| 7,437,321 B2 | 10/2008 | Hanechak | |
| 7,490,057 B2 | 2/2009 | Connolly et al. | |
| 7,584,424 B2 | 9/2009 | Hanechak | |
| 7,619,638 B2 | 11/2009 | Walker, Jr. et al. | |
| 7,672,010 B2 * | 3/2010 | Hirtenreiter | G06F 17/243 358/1.11 |
| 8,099,263 B2 | 1/2012 | Walker, Jr. et al. | |
| 8,373,873 B2 * | 2/2013 | Negishi | G06F 3/121 345/471 |
| 8,717,596 B2 | 5/2014 | Cogan | |
| 2001/0046066 A1 * | 11/2001 | Ueda | H04N 1/42 358/1.15 |
| 2002/0015179 A1 | 2/2002 | Igarashi et al. | |
| 2002/0036654 A1 | 3/2002 | Evans et al. | |
| 2002/0087702 A1 | 7/2002 | Mori | |
| 2002/0097418 A1 | 7/2002 | Chang et al. | |
| 2002/0103826 A1 * | 8/2002 | Kriho | G06F 17/243 715/225 |
| 2002/0111963 A1 | 8/2002 | Gebert et al. | |
| 2002/0136578 A1 * | 9/2002 | Johnson | G06K 15/02 400/70 |
| 2002/0194219 A1 | 12/2002 | Bradley et al. | |
| 2003/0189726 A1 | 10/2003 | Kloosterman et al. | |
| 2004/0073485 A1 * | 4/2004 | Liu | G06Q 30/02 705/14.27 |
| 2004/0133924 A1 | 7/2004 | Wilkins et al. | |
| 2004/0205609 A1 * | 10/2004 | Milton | G06F 17/30867 715/248 |
| 2004/0207876 A1 | 10/2004 | Aschenbrenner | |
| 2004/0246254 A1 * | 12/2004 | Opstad | G06F 17/3025 345/467 |
| 2005/0048458 A1 | 3/2005 | Collins et al. | |
| 2005/0240971 A1 * | 10/2005 | Koppich | H04N 1/00291 725/80 |
| 2006/0279769 A1 | 12/2006 | Ludwig et al. | |
| 2006/0279772 A1 * | 12/2006 | Ludwig | G06F 21/608 358/1.15 |
| 2007/0177181 A1 | 8/2007 | Herr | |
| 2008/0083027 A1 | 4/2008 | Freiman et al. | |
| 2008/0120541 A1 * | 5/2008 | Cheng | G06F 17/2217 715/269 |
| 2008/0259392 A1 | 10/2008 | Tokumoto | |
| 2008/0267491 A1 * | 10/2008 | Matsui | G06F 3/1204 382/162 |
| 2009/0051947 A1 | 2/2009 | Kuroshima | |
| 2010/0257446 A1 * | 10/2010 | Woolfe | G06F 3/1204 715/274 |
| 2011/0026042 A1 | 2/2011 | Cogan et al. | |
| 2011/0075196 A1 | 3/2011 | Cogan | |
| 2011/0289407 A1 * | 11/2011 | Naik | G06F 17/214 715/269 |
| 2014/0281940 A1 | 9/2014 | Cogan | |

FOREIGN PATENT DOCUMENTS

| | | |
|---|---|---|
| EP | 2163983 | 3/2010 |
| GB | 2324896 | 11/1998 |
| JP | 2005-022298 | 1/2005 |
| WO | WO 97/27555 | 7/1997 |
| WO | WO 99/19830 | 4/1999 |
| WO | WO 2011/041241 | 4/2011 |
| WO | WO 2014/160100 | 10/2014 |

OTHER PUBLICATIONS

Ciancarini, P., et al., "A multi-agent process centered environment integrated with the WWW," Proceedings—The Workshop on Enabling Technologies: Infrastructure for Collaborative Enterprises, US, IEEE Computer Society Press, Los Alamitos, CA, Jan. 1, 1997, p. 113-120 XP008090172, ISSN: 1080-1383.
Feibus, A., "RequisitePro 3.0 Manages Requirements, Documents," Information week, No. 677, p. 18A-22A, Apr. 13, 1998.
Marotta, M.E., "Detroit: Contracting for Quality," Industrial Robot, vol. 20, No. 4, p. 23-25, 1993.
Matrix One, Inc., "Matrix", Online!—1997 XP002111377, retrieved from the Internet, <URL: Available on-line 1997>.
Office Action for U.S. Appl. No. 11/200,861, mailed Aug. 30, 2012.
Final Office Action for U.S. Appl. No. 11/200,861, mailed Jun. 3, 2013.
Office Action for U.S. Appl. No. 12/534,717, mailed Jan. 30, 2013.
Office Action for U.S. Appl. No. 11/200,861, mailed Jan. 19, 2012.
Office Action for U.S. Appl. No. 11/200,861, mailed Oct. 2, 2009.
Office Action for U.S. Appl. No. 11/200,861, mailed Jun. 21, 2010.
Office Action for U.S. Appl. No. 11/200,861, mailed Jun. 8, 2011.
Office Action for U.S. Appl. No. 12/571,387, mailed Nov. 22, 2011.
Office Action for U.S. Appl. No. 12/571,387, mailed Jul. 24, 2012.
Office Action for U.S. Appl. No. 12/571,387, mailed May 2, 2013.
International Search Report and Written Opinion for International Application No. PCT/US2010/050302, mailed Dec. 16, 2010.
International Search Report and Written Opinion for International Application No. PCT/US2010/044298, mailed Oct. 20, 2010.
Office Action for U.S. Appl. No. 13/827,173, mailed Mar. 27, 2015.
International Search Report and Written Opinion for International Application No. PCT/US2014/025814, mailed Jul. 11, 2014.
Sixtus, M., "Das Netz erfindet sich neu: Ein Streifzug durch das Web 2.0," CT Magazin Fuer Computer Technik, 2006(5):144-151 (2006).

* cited by examiner

Typical System For Implementing Embodiments of the Present Invention

Typical Server System For Implementation of Embodiments of the Present Invention Typical Client System For Implementation of Embodiments of the Present Invention Typical Composition Workflow One Embodiment of Dynamic
Downgraded Font Generation One Embodiment of Dynamic
Downgraded Font Generation One Embodiment of Dynamic Downgraded Font Provision One Embodiment of Client-Side Downgraded Font Provision One Embodiment of Integration of Downgraded Font

SYSTEMS AND METHODS FOR PROVIDING VARIABLE DATA PRINTING (VDP) USING DYNAMIC FONT DOWNGRADING

CROSS-REFERENCE TO RELATED APPLICATIONS

This application is a continuation of U.S. application Ser. No. 12/571,387, entitled SYSTEMS & METHODS FOR PROVIDING VARIABLE DATA PRINTING (VDP) USING DYNAMIC FONT DOWNGRADING, filed on Sep. 30, 2009, which relates to U.S. application Ser. No. 12/534,717, entitled APPARATUS & METHODS FOR IMAGE PROCESSING OPTIMIZATION FOR VARIABLE DATA PRINTING, filed on Aug. 3, 2009 (now U.S. Pat. No. 8,670,149) and to U.S. patent application Ser. No. 11/200,861, entitled SYSTEM & METHOD FOR DISTRIBUTED DESIGN OF A VARIABLE DATA PUBLICATION, filed on Aug. 10, 2005. Each of these applications is hereby incorporated by reference herein in its entirety for all purposes.

FIELD OF THE INVENTION

The present invention relates generally to digital printing and digital printing systems and methods. More particularly but not exclusively, the invention relates to systems and methods for providing dynamically downgraded fonts for use in online variable data printing (VDP) screen display and editing.

BACKGROUND

As printing technologies migrate from traditional printing methods such as lithography to digital printing, digital printers and associated processing of printed images and page layouts in digital printing systems has dramatically increased. While traditional printing methods may currently be more cost effective for large quantities of standardized print, the cost of digital printing systems and associated media has continued to decrease, making digital printing more affordable. In addition, digital printing technology can often facilitate customized printing in a more cost-effective way that traditional high volume printing methods.

For example, one type of customized printing is known as variable-data printing or variable data publishing (VDP), also known as variable-information printing (VI or VIP). VDP and related technologies are a form of on-demand printing in which elements such as text, graphics and images may be changed from one printed piece to the next, without stopping or slowing down the printing process and without using information from a database or external file. For example, a set of personalized letters, each with the same basic layout, can be printed with a different name and address on each letter, while retaining other common elements, such as images, text, associated drop shadows, or other common elements. Variable data printing is typically used for direct marketing, customer relationship management, advertising and invoicing on self-mailers, brochures, or postcard campaigns, but may also be used for a range of other printing applications where customization is required.

VDP is a direct outgrowth of digital printing technology, which harnesses computer systems, digital printing devices, and specialized software to create high-quality black and white or full color documents with a look and feel comparable to conventional offset printing. Consequently, VDP enables the mass customization of documents via digital print technology, as opposed to the mass production of a single document using offset lithography. For example, instead of producing 10,000 copies of a single document to deliver a single message to 10,000 customers, variable data printing provides for printing 10,000 unique documents sharing some common elements as well as providing customized messages for each customer.

There are two main operational modes to VDP. In one mode, the document template and the variable information are both sent to a Raster Image Processor or Raster Image Processing System (RIP) which combines the two to produce each unique document. The other mode is to combine the static and variable elements prior to printing, using specialized VDP software applications. These applications produce a print job in a programming language format, such as in PostScript or PPML, which organizes the print stream efficiently so that the static elements need only be processed once by the RIP. Consequently, digital printing systems using VDP have become more and more pervasive, while providing high quality, customizable print output on even small office and print shop printing devices. The wide availability of digital pre-print tools such as the FusionPro Desktop, designed and sold by the assignee of this application, allow users to generate custom VDP print jobs on a wide variety of print composition computer systems and either print them on their own printing systems or send the print job to a third party printing system to generate the printed output.

More recently online versions of application such as Fusion Pro Desktop allowing online "live" generation and previewing of VDP print jobs are being provided. One example of such a product is "FusionPro Live," provided by Printable Technologies Inc., the assignee of the present invention. Online VDP print generation often requires additional functionality compared to standalone applications, and in particular presents concerns regarding data transfer bandwidth and proprietary IP licensing and use limitations. Consequently, there is a need in the art for efficient systems and methods for facilitating generation, display and editing of online VDP print jobs, including efficient provision and display of fonts for screen display. In various embodiments, the present invention addresses these problems as well as others.

SUMMARY

The present invention is related generally to variable data printing (VDP) and in particular systems and methods for providing variable data printing using downgraded fonts.

In one aspect, the present invention relates to a method for providing variable data printing (VDP) using a server system comprising providing, to a client system disposed to be communicatively coupled to the server system, data defining a user interface to facilitate generation and/or editing of a VDP print job, receiving, from the client system, data associated with a browser program or application program executing on the client system and providing, in response to said receiving, a downgraded font set disposed for rendering on the client system.

In another aspect, the present invention relates to a server system for providing variable data printing (VDP) composition, comprising a processor, a network interface and a processor-readable medium containing instructions for execution on said processor to provide, via the network interface, to a client system, data defining a user interface to facilitate generation and/or editing of a VDP print job, receive, from the client system via the network interface, data associated with a browser program or application program executing on the client system and provide in response to said receiving, via the network interface, a set of downgraded fonts disposed for rendering on the client system.

In another aspect, the present invention relates to a method for providing variable data printing (VDP) on a client system, comprising receiving, from a server system, data defining a user interface to facilitate generation and/or editing of a VDP print job, receiving, from the server system, a set of downgraded fonts and rendering, on a display device or printer of the client system, at least a portion of the VDP print job including one or more characters or symbols using one or more fonts of the set of downgraded fonts.

In another aspect, the present invention relates to a system for providing variable data printing (VDP) composition on a client system, comprising a processor, a display device, a network interface and a processor-readable medium containing instructions for execution on said processor to receive from a server system, via the network interface, data defining a user interface to be used to facilitate generation and/or editing of a VDP print job, receive, from the server system via the network interface, a set of downgraded fonts and render, on the display device or a printer coupled to the client system, at least a portion of the VDP print job, wherein one or more characters and/or symbols are rendered on the display device or printer using one or more fonts of the set of downgraded fonts.

In another aspect, the present invention relates to a system for providing VDP printing, comprising a server processor, a server network interface and a server processor-readable medium containing instructions for execution on said server processor to provide, via the network interface, data defining a user interface to facilitate generation and/or editing of the VDP print job, receive, via the network interface, data associated with a browser program or application program and provide in response to said receiving, via the network interface, a set of downgraded fonts disposed for rendering and a client system communicatively coupled to the server system, comprising a client processor, a display device, a client network interface and a processor-readable medium containing instructions for execution on said client processor to receive from the server system, via the client network interface, data defining the graphical user interface used to facilitate generation or editing of the VDP print job, receive, from the server system via the client network interface, the set of downgraded fonts and render, on the display device or a printer coupled to the client system, at least a portion of the VDP print job, wherein one or more characters and/or symbols of the VDP print job are rendered on the display device or printer using one or more fonts of the set of downgraded fonts.

In another aspect, the present invention relates to a method for providing variable data printing (VDP) comprising providing, from a server system to a client system disposed to be communicatively coupled to a server system, data defining a user interface to facilitate generation and/or editing of a VDP print job, receiving, at the client system from the server system, data defining the interface to facilitate generation or editing of a VDP print job, receiving at the server system, from the client system, data associated with a browser program or application program executing on the client system, providing, in response to said receiving, a downgraded font set disposed for rendering on the client system, receiving, at the client system from the server system, the set of downgraded fonts and rendering, on a display device or printer of the client system, at least a portion of the VDP print job including one or more characters or symbols using one or more fonts of the set of downgraded fonts.

In another aspect, the present invention relates to a machine readable medium containing instructions for execution on a processor to provide to a client system data defining a user interface to facilitate generation and/or editing of a VDP print job, receive, from the client system, data associated with a browser program or application program executing on the client system and provide, in response to said receiving, a downgraded font set disposed for rendering on the client system.

In another aspect, the present invention relates to a machine readable medium containing instructions for execution on a processor to receive, from a server system, data defining a user interface to facilitate generation and/or editing of a VDP print job, receive, from the server system, a set of downgraded fonts and render, on a display device or printer of the client system, at least a portion of the VDP print job including one or more characters or symbols using one or more fonts of the set of downgraded fonts.

Additional aspects of the present invention are further described below in conjunction with the appended Drawings.

BRIEF DESCRIPTION OF THE DRAWINGS

The present invention is more fully appreciated in connection with the following detailed description taken in conjunction with the accompanying drawings, wherein.

DETAILED DESCRIPTION OF EMBODIMENTS OF THE PRESENT INVENTION

Overview

Figure 1A:
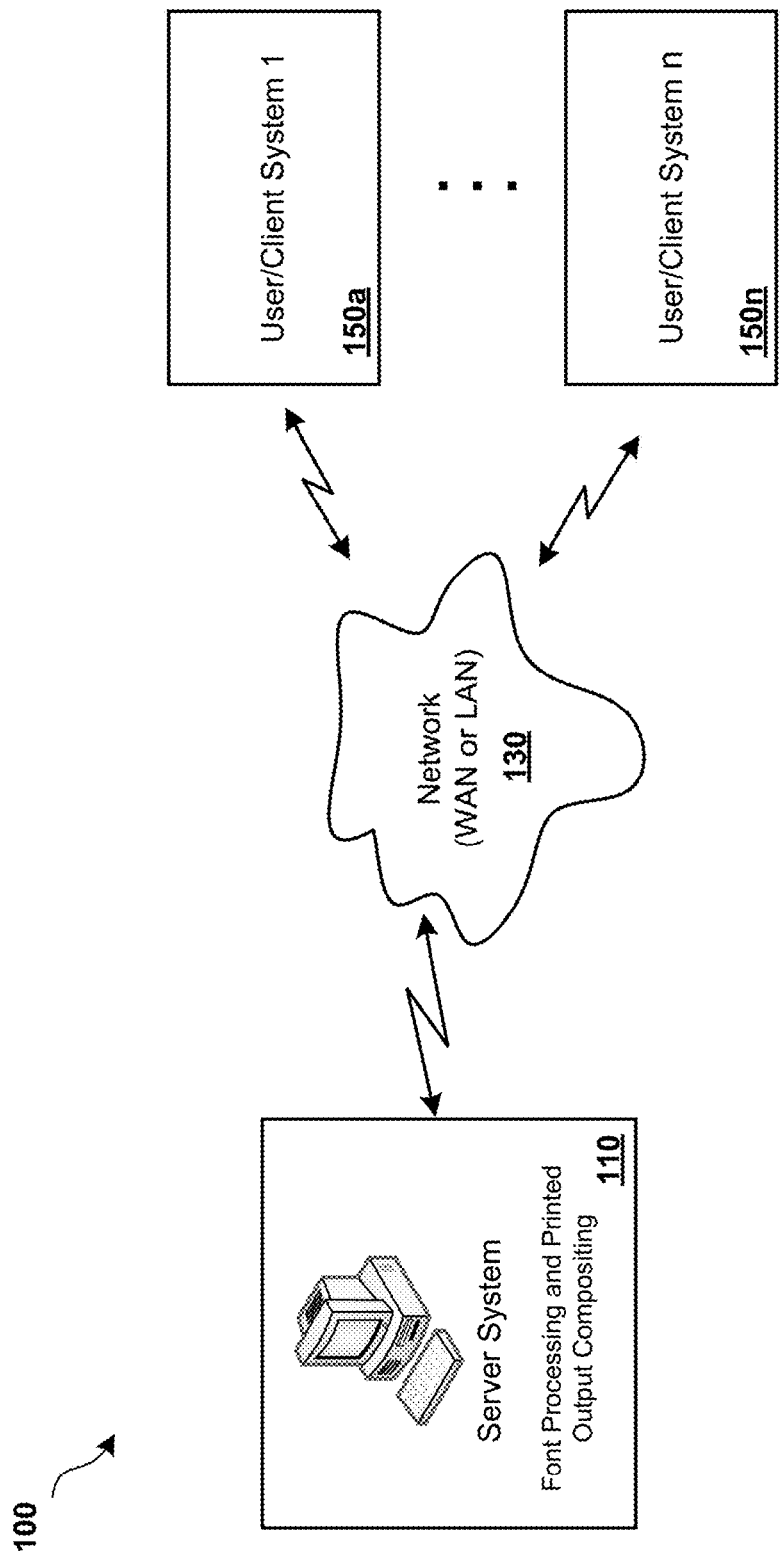
FIG. 1A is an illustration of a typical system facilitating online VDP print job generation on which embodiments of the present invention may be implemented.

As noted previously, variable data printing (VDP) systems facilitate user composition of customized VDP print jobs at the user's print composition system. In some implementations, such as in a product denoted as "FusionPro Live" provided by Printable Technologies Inc., the assignee of the present invention, VDP print jobs may alternately be generated and edited on a user's client computer system over the Internet or other networks, without the need to acquire and install a complete client-side composition application program such as FusionPro, also provided by Printable Technologies Inc.

In FusionPro Live implementations, a user can generate, preview and edit a VDP print job and the associated content and text, including selected fonts, on a web browser. However, in order to implement this functionality, fonts used for the print job must frequently be transferred to the client computer for accurate font rendering (i.e., display) on the screen display. This process can result in large amounts of data representing full vector font sets being downloaded to the client computer. Moreover, this process creates potential problems associated with licensing and use of proprietary font sets.

Accordingly, the present invention addresses this issue as well as others by providing systems and methods for facilitating dynamic provisioning of "downgraded fonts" to a client computer for use in screen display of the VDP print job. This approach may improve efficiency and performance of online composition applications, as well as address proprietary font licensing or other problems.

In particular, in one aspect, the present invention relates to a method for providing variable data printing (VDP) using a server system comprising providing, to a client system disposed to be communicatively coupled to the server system, data defining a user interface to facilitate generation and/or editing of a VDP print job, receiving, from the client system, data associated with a browser program or application program executing on the client system and providing, in response to said receiving, a downgraded font set disposed for rendering on the client system.

In another aspect, the present invention relates to a server system for providing variable data printing (VDP) composition, comprising a processor, a network interface and a processor-readable medium containing instructions for execution on said processor to provide, via the network interface, to a client system, data defining a user interface to facilitate generation and/or editing of a VDP print job, receive, from the client system via the network interface, data associated with a browser program or application program executing on the client system and provide in response to said receiving, via the network interface, a set of downgraded fonts disposed for rendering on the client system.

In another aspect, the present invention relates to a method for providing variable data printing (VDP) on a client system, comprising receiving, from a server system, data defining a user interface to facilitate generation and/or editing of a VDP print job, receiving, from the server system, a set of downgraded fonts and rendering, on a display device or printer of the client system, at least a portion of the VDP print job including one or more characters or symbols using one or more fonts of the set of downgraded fonts.

In another aspect, the present invention relates to a system for providing variable data printing (VDP) composition on a client system, comprising a processor, a display device, a network interface and a processor-readable medium containing instructions for execution on said processor to receive from a server system, via the network interface, data defining a user interface to be used to facilitate generation and/or editing of a VDP print job, receive, from the server system via the network interface, a set of downgraded fonts and render, on the display device or a printer coupled to the client system, at least a portion of the VDP print job, wherein one or more characters and/or symbols are rendered on the display device or printer using one or more fonts of the set of downgraded fonts.

In another aspect, the present invention relates to a system for providing VDP printing, comprising a server processor, a server network interface and a server processor-readable medium containing instructions for execution on said server processor to provide, via the network interface, data defining a user interface to facilitate generation and/or editing of the VDP print job, receive, via the network interface, data associated with a browser program or application program and provide in response to said receiving, via the network interface, a set of downgraded fonts disposed for rendering and a client system communicatively coupled to the server system, comprising a client processor, a display device, a client network interface and a processor-readable medium containing instructions for execution on said client processor to receive from the server system, via the client network interface, data defining the graphical user interface used to facilitate generation or editing of the VDP print job, receive, from the server system via the client network interface, the set of downgraded fonts and render, on the display device or a printer coupled to the client system, at least a portion of the VDP print job, wherein one or more characters and/or symbols of the VDP print job are rendered on the display device or printer using one or more fonts of the set of downgraded fonts.

In another aspect, the present invention relates to a method for providing variable data printing (VDP) comprising providing, from a server system to a client system disposed to be communicatively coupled to a server system, data defining a user interface to facilitate generation and/or editing of a VDP print job, receiving, at the client system from the server system, data defining the interface to facilitate generation or editing of a VDP print job, receiving at the server system, from the client system, data associated with a browser program or application program executing on the client system, providing, in response to said receiving, a downgraded font set disposed for rendering on the client system, receiving, at the client system from the server system, the set of downgraded fonts and rendering, on a display device or printer of the client system, at least a portion of the VDP print job including one or more characters or symbols using one or more fonts of the set of downgraded fonts.

In another aspect, the present invention relates to a machine readable medium containing instructions for execution on a processor to provide to a client system data defining a user interface to facilitate generation and/or editing of a VDP print job, receive, from the client system, data associated with a browser program or application program executing on the client system and provide, in response to said receiving, a downgraded font set disposed for rendering on the client system.

In another aspect, the present invention relates to a machine readable medium containing instructions for execution on a processor to receive, from a server system, data defining a user interface to facilitate generation and/or editing of a VDP print job, receive, from the server system, a set of downgraded fonts and render, on a display device or printer of the client system, at least a portion of the VDP print job including one or more characters or symbols using one or more fonts of the set of downgraded fonts.

Additional aspects of the present invention are further described below in conjunction with the appended Drawings.

The present invention relates to VDP printing using downgraded fonts. As used herein, the term "downgraded font(s)" describes a set of one or more fonts, as typically represented by characters (such as the letters A, B, C . . . Z) or symbols (such as punctuation marks, @, $, %, ^, greek letters or other symbols or non-English language characters), that are reduced in format, resolution and/or functionality with regard to a corresponding full font set so as to be limited in application to screen displays or previews and in some cases draft quality printed output.

More specifically, as is known in the art, a full font set generally comprises a set of characters including letters and numbers, as well as symbols, in a vector format, such as TrueType or OpenType fonts. Full font sets are typically given names such as Times New Roman (as used in this document), Arial, Helvetica or any of the other myriad of common as well as lesser-known font sets.

In typical editing applications, a word processor or other application uses the full font set in the application or computer operating system to provide WYSIWIG (What You See Is What You Get) previewing of a job on a display device such as a computer monitor, at arbitrary sizes and/or scaling. In addition, the full font set can be used by printers, RIPs (raster image processors) or other output hardware and software to generate printed output.

However, providing a full font set for a particular font involves substantial transfers of data representing the fonts, as well as potential licensing issues with regard to particular uses of the fonts (i.e., screen display versus printed output, etc.). In accordance with aspects of the present invention, a downgraded font set in raster format can be provided instead of a full font set (as typically provided in vector format) so as to provide more limited display and/or printing functionality in a VDP editor. In particular, in typical embodiments, the downgraded font set includes only a subset of the full font set, with the subset providing limited font functionality for screen display and/or draft printing.

For example, in an exemplary embodiment, a downgraded font set provides a subset of characters of the full font set in a limited set of font sizes or points, with the subset of characters being provided as a set of pre-rasterized fonts based on a specific screen display format, web browser format, draft printer format and/or VDP print job. As is know in the art, fonts in vector formats can be rasterized (i.e., converted to a bitmap format) and used as bitmaps or images in documents. This process generally requires selection of a desired image size such that the displayed or printed font, as rasterized, still appears aesthetically pleasing and intelligible at the desired output size without requiring the use of the full vector type library (i.e., TrueType or OpenType fonts). A description of approaches to font pre-rasterization is described in related co-pending U.S. patent application Ser. No. 12/534,717, entitled APPARATUS & METHODS FOR IMAGE PROCESSING OPTIMIZATION FOR VARIABLE DATA PRINTING, the content of which is incorporated by reference herein in its entirety.

Typical Printing System Configuration

In order to further describe details of various embodiments of the present invention, attention is now directed to FIG. 1A, which illustrates a typical VDP printing system 100 on which various embodiments of the present invention may be implemented. As shown in FIG. 1A, system 100 includes a server system 110 and one or more client system 150a-150n. The server and client systems are communicatively coupled via a network 130, typically the Internet and/or other additional connecting wired or wireless networks; however, in some implementations the network 130 may also be an intranet or other wide or local area network.

Connectivity provided by network 130 facilitates client-server functionality between the client/user system(s) 150 and server system 110. This functionality includes providing VDP print job generation and editing tools and templates from the server system 110 and client side viewing and editing functionality in conjunction with a web browser or, in some embodiments, a client-side browsing-like application providing similar or equivalent web-browsing functionality. This equivalent functionality may be integrated in another application program, such as a composition program or other application.

Exchange of information via network 130 between the client system 150 and server system 110 may include transfer of control data and/or information associated with the print job, images or other raster data objects, vector data objects, print job formatting data, fonts and/or other data or information. In particular, network 130 facilitates receipt of data and control information associated with the composition application being executed on the client-side browser or browsing application, as well as exchange of composition templates and dynamically downgraded fonts generated in the server system 110 to the client system 150 for use in screen display functions and/or in draft printing functions.

Figure 1B:
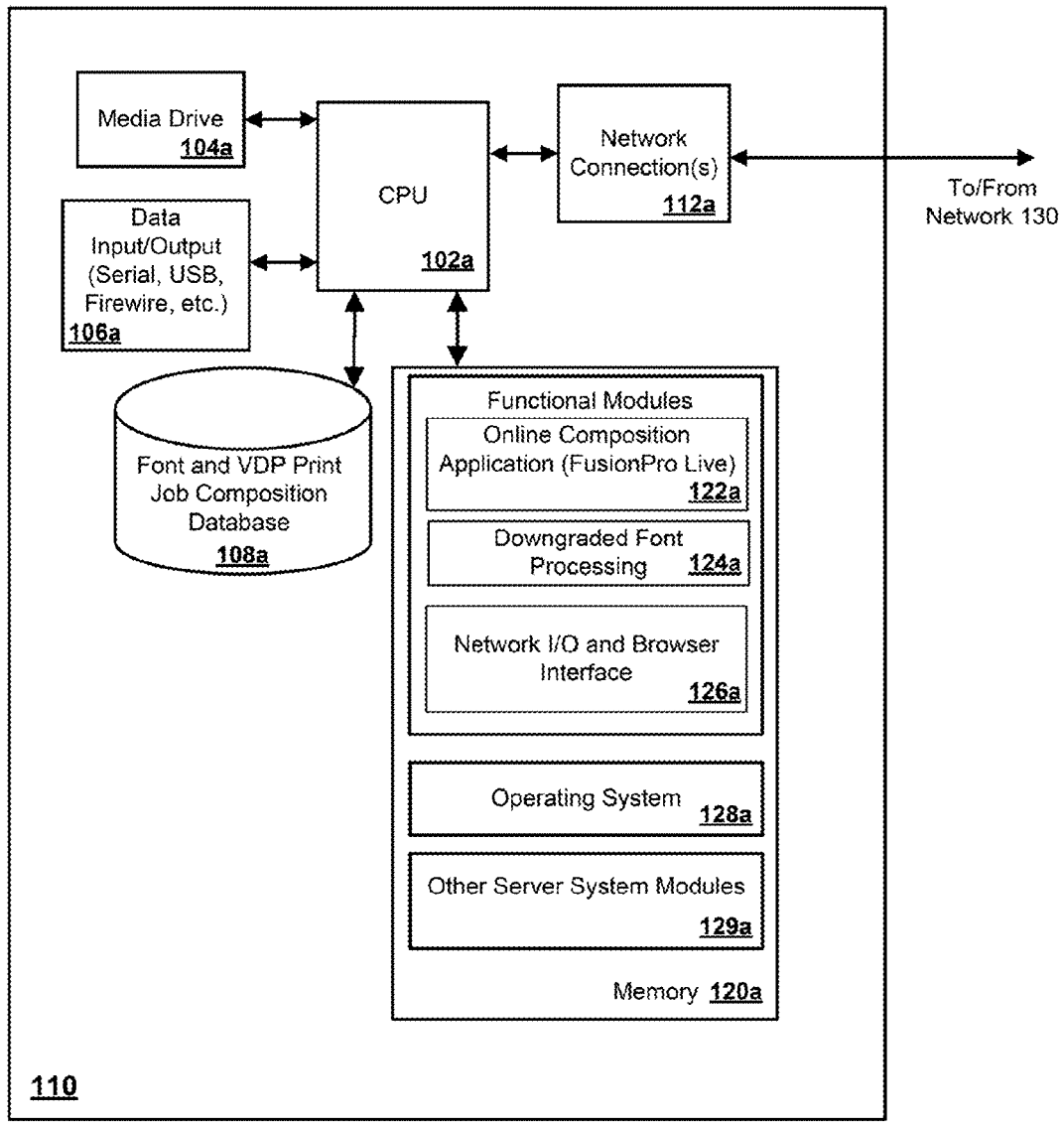
FIG. 1B is an illustration of a Server System on which embodiments of the present invention may be implemented.

FIG. 1B illustrates additional details of Server System 110 as shown in FIG. 1A. In particular, server system 110 includes one or more processors 102a, a memory space or spaces 120a and a network connection module 112a facilitating connection between system 110 and the client system 150 via network 130. In addition, server system 110 includes a database 108a for storing full font sets as well as dynamically downgraded font sets (subsets, typically limited rasterized versions of the full font set), as well as optionally other data or information. Database 108a may be part of or integrated within memory 120a in some embodiments, or it may be a separate database or part of a separate computer system (not shown).

Server System 110 may also include one or more media drives 104a, data I/O modules supporting various networking, serial, USB, firewire, or other interfaces, or user I/O devices such as keyboards or mice (not shown). In addition, system 110 may include other standard or typical computers system components and peripherals such as displays, printers, scanners, or other devices or peripherals (not shown).

Memory 120a includes several functional modules that are configured to implement the functionality described in further detail herein below. In particular, memory 120a includes an online composition module 122a configured to provide user interfaces (GU's), templates, images, text or other objects to client system 150 to facilitate generation, display and editing of the VDP print job. In addition, memory 120a includes a downgraded font processing module 124a configured to generate, based on information associated with the client-side browser or browsing application and/or the VDP print job, downgraded fonts for provisioning to the client computer system 150 to facilitate screen display and/or printing of the VDP print job. In some implementations, a set of downgraded fonts may be pre-generated and stored in database 108a, with the font processing module 124a then selecting and packaging an appropriate downgraded font set to be provided to the client computer 150.

Additional modules in memory 120a may include a network I/O module and Browser Interface module 126a to facilitate network connectivity with network connection module 112a and/or provide interface content to or from the client-side browser or browser-like application.

Figure 1C:
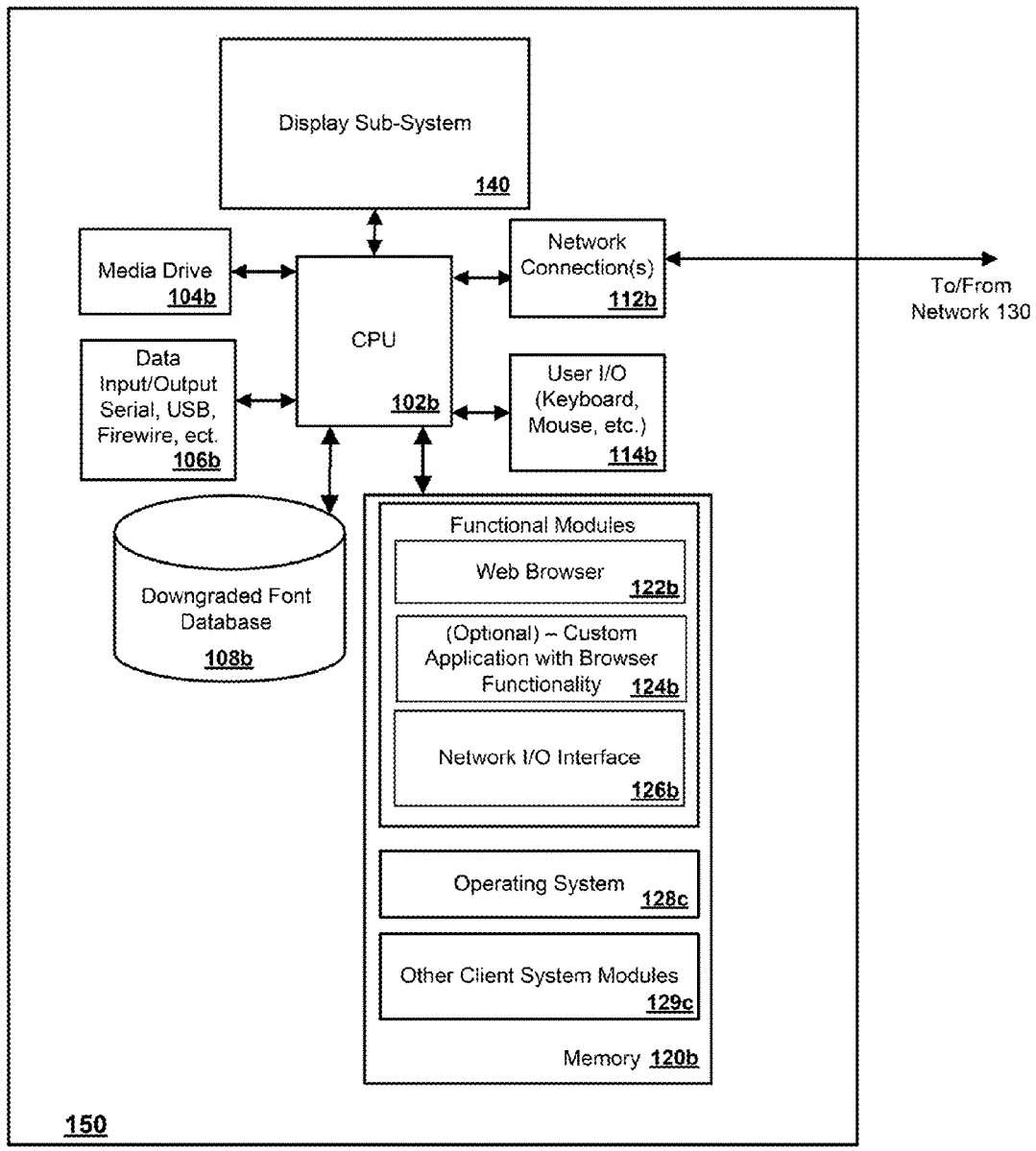
FIG. 1C is an illustration of a Client System on which embodiments of the present invention may be implemented.

FIG. 1C illustrates additional details of an embodiment of a typical Client System 150 as shown in FIG. 1A. Client System 150 includes one or more processors 102b, network connection module 112b, memory 120b, as well as one or more databases 108b for storing the downgraded fonts, downloaded VDP templates and/or other data or information. Network module 112b facilitates connection between Client System 150 and Server System 110 as shown in FIG. 1.

Database 108b may be part of or integrated within memory 120b in some embodiments. Client System 130 may also include one or more media drives 104*b*, data I/O module(s) 106*b*, as well as user I/O 114*b*. In addition, Client System 130 includes one or more display sub-systems 140, typically comprising a display device as well as any associated graphics hardware and/or software (not shown). In particular, display device 140 is configured to provide a user of the Client System 150 with a web-browser or browser-like application on which to display the composed VDP print job. As is apparent, any of a variety of types of displays may be used in various implementations of Client System 150, thereby requiring different formats of downgraded fonts depending on the Client System 150 as well as the web browser type, composition application and/or VDP print job content.

Client System 150 may also include other modules including an operating system 128*c*, network I/O interface 126*b* or other modules 129*c*. In addition, as noted previously, in some embodiments a customized standalone client-side application may be provided as module 124*b* in addition to or in place of a client-side browser application 122*b*. In these implementations, the standalone application includes web-browser like functionality along with, optionally, other enhanced or customized VDP functionality (not shown). In typical implementations, the browser or browser-like application includes version data or other data defining or characterizing the application program. This data may be used by the Server System 110 in selecting an appropriate set of downgraded fonts for provisioning and/or delivery to the Client System 150.

Figure 2:
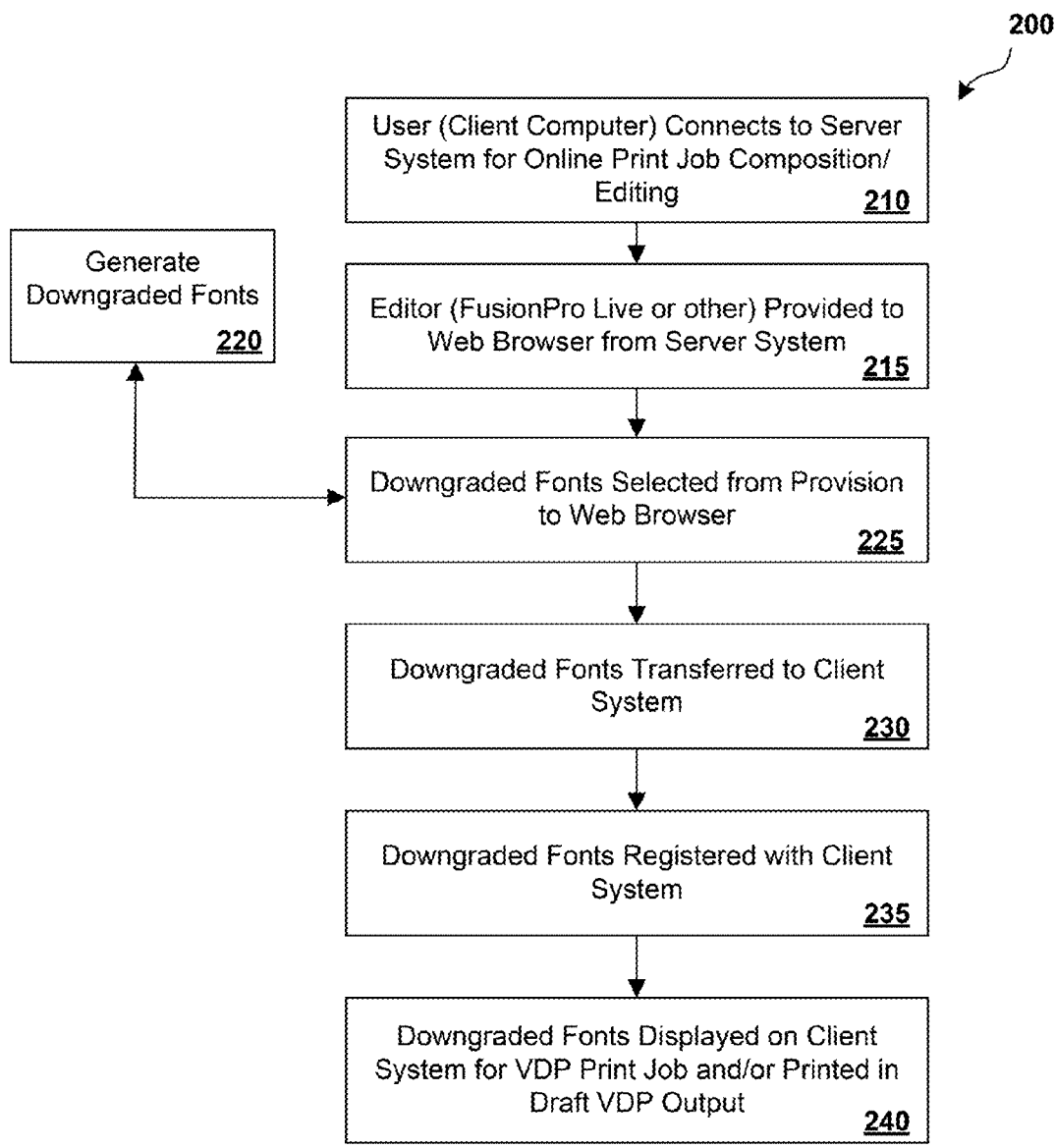
FIG. 2 is an example workflow for providing online VDP print job composition in accordance with embodiments of the present invention.

Attention is now directed to FIG. 2, which illustrates a typical VDP print job composition workflow 200 in accordance with the present invention. As shown in FIG. 2, VDP composition is typically initiated by a user through a user/Client System (such as Client Systems 150*a*-*n* of FIG. 1) via connection to a server system (such as Server System 110) at stage 210. This is typically done through a standard web browser, such as Microsoft Internet Explorer or the Firefox browser. Alternately, as noted previously, a customized VDP user/client-side application, such as module 124*b* of FIG. 1C, may be provided in client system 150, with the customized VDP application including web browsing functionality as well as other VDP functionality.

At stage 215, an editing/composition web page, such as a text or graphics editor page, is served to the web browser of the client-side system from the server system and displayed on a display device such as display 140 of FIG. 1C. For example, the editing functionality may be as implemented by the FusionPro Live application provided by the assignee of the present invention using the graphical user interfaces and functionality of that application on the user's client computer system. The editing program facilitates editing of the VDP print job as hosted by the server system, and typically allows users to edit content in a text or graphics editor based on a correspondingly provided template containing formatted VDP data and/or other associated VDP documents or objects stored on the server system. For example, the web browser of the client system may allow a user to access the template from the server system over the network (such as network 130 of FIG. 1) and, within the browser window, manipulate individual frames or objects of a document based on the template, such as moving and resizing them, changing textual content, or modifying other aspects of the VDP print document.

The textual content will typically be displayed on the client system display device in a WYSIWIG format (What You See Is What You Get), and in order to do this, the web browser (or other browser-like application) must have access to the proper fonts and must render them appropriately on the client system. This creates problems because of differences in font formats between client systems, different display and browser sizing requirements, as well as distribution rights issues associated with proprietary font libraries in vector format. Consequently, it is often impractical for the server system to simply download the full font character set to the client system to render the text in the appropriate way.

Consequently, at stage 225, a downgraded font set is generated or selected to be provided to the client system and associated browser or browser-like application. In some embodiments, the downgraded fonts are generated at stage 220 in response to a specific VDP job and associated request and/or are based on the request and/or specifically provided client system information or application or browser-specific information. In alternate embodiments, a set of downgraded fonts may be pregenerated at stage 220 and stored in database 108*a* as shown in FIG. 1B for later selection. The downgraded font set, typically in raster format, includes one or more font sizes from the associated full font character set (where the full font character contains every character in the "parent" fonts, such as vector-based TrueType, OpenType, or other types of fonts). The downgraded fonts are pre-rasterized from the associated vector font set into one or more subsets of font characters at subset of font characters from the full font set. For example, the downgraded font set may include only the upper- and lower-case English letters, digits and common punctuation while eliminating special characters and glyphs, and/or may be based on frequency of character used in the target documents, or on other customization criteria. In accordance with one aspect of the invention, raster-to-raster conversion may also be done; however, this approach is not currently favored in the digital printing market. Alternately, in some embodiments vector-to-vector conversion may be done, with the downgraded font set being based on a subset of the full font set and/or on a vector subset having reduced or limited functionality compared to the full font set.

In some embodiments, multiple sets of rasterized fonts may be provided at different sizes so as to facilitate more efficient loading of the fonts into the VDP document being displayed on the client system. For example, a subset of the English language letters (e.g., the 26 capital letter characters, or other subsets) may be rendered into two or more different rasterized sizes, with the downgraded font set then including multiple rasterized font types having less than complete character sets in each. It will be apparent that other subset permutations are also possible.

Once the downgraded fonts are selected at stage 225, they may then be aggregated as a set and then transferred to the client system at stage 230. In some embodiments, downgraded fonts may be dynamically sent to the client computer based on specific browser requests and/or VDP print job requirements as communicated from the client system to the server system. In other embodiments, a specific set of downgraded fonts may be sent as a set or package based on information provided from the client system or based on standardized or similar VDP job requirements or on other criteria associated with the particular print job or with typical print jobs.

Upon receipt at the client system at stage 240, the downgraded fonts may then be registered with the client system operating system and/or browser or browser-like application program, such as operating system module 129*c* as shown in FIG. 1C, and then used by the client system to render the rasterized fonts onto the client system display device and/or generate printed output from a printing device associated with the client system.

Figure 3A:
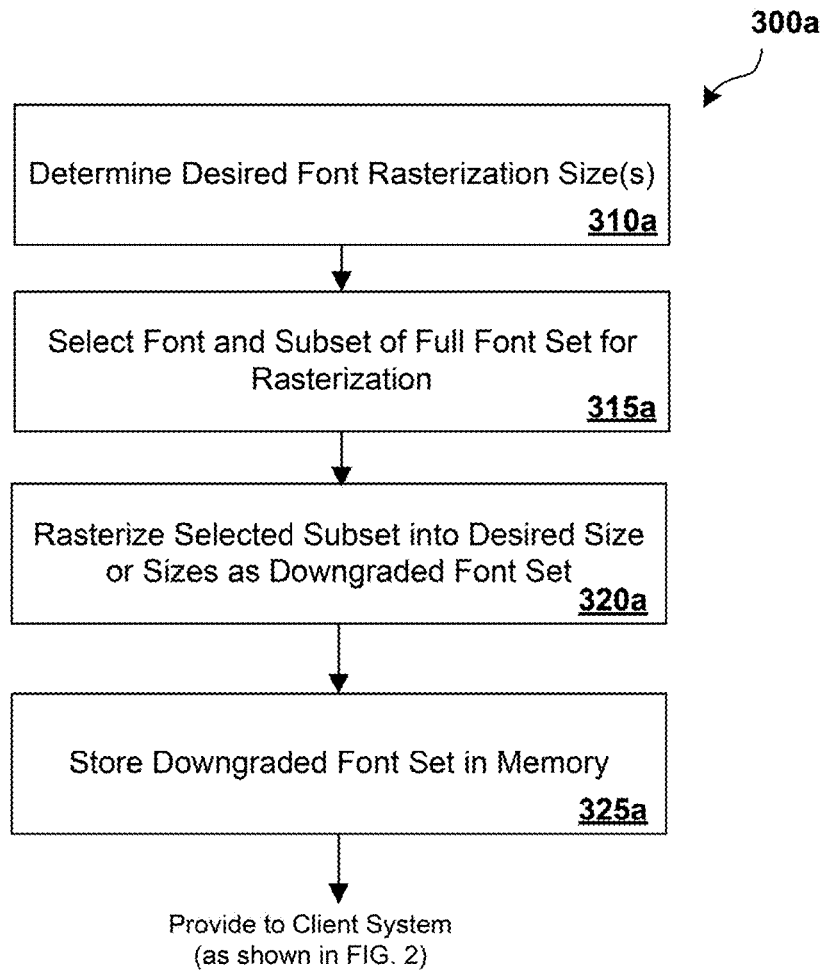
FIG. 3A is an illustration of an embodiment of dynamic downgraded font generation in accordance with aspects of the present invention.

FIG. 3A details additional aspects of an embodiment of selection and generation of downgraded fonts in accordance with aspects of the present invention. As shown in FIG. 3A, a process for downgraded font generation 300a may begin at stage 310a with selection or determination of a desired size or sizes from the rasterized downgraded fonts. This stage may include receiving input at the server system regarding the client side system configuration and/or display type, browser, browser-like application and/or VDP print job being composited so as to generate, in response to input, appropriate rasterized font size or sizes. For example, the specification may be for Helvetica and Times New Roman, sizes 12 and 14 point, uppercase English letters only, for the display of titles. However, it is apparent that other downgraed font subset specifications may alternately be used. In addition, a specific type of font or fonts may be selected at stage 315a (based on the fonts chosen in the VDP print job) and, in some embodiments, it may be desirable to select a subset of the characters in the font set for rasterization. Once these criteria are determined (i.e., font type, rasterized size or sizes, subset characters), the selected downgraded font set or sets may then be generated at stage 320a by rasterizing the appropriate characters into one or more sizes. The downgraded font set may then be stored in memory, such as in database 108a of FIG. 1A, at stage 325a. In addition, the downgraded font sets may then be provided to the client system as shown in FIG. 2. Alternately, a pre-generated downgraded font set or subsets may be sent alone or in combination to the client system.

Figure 3B:
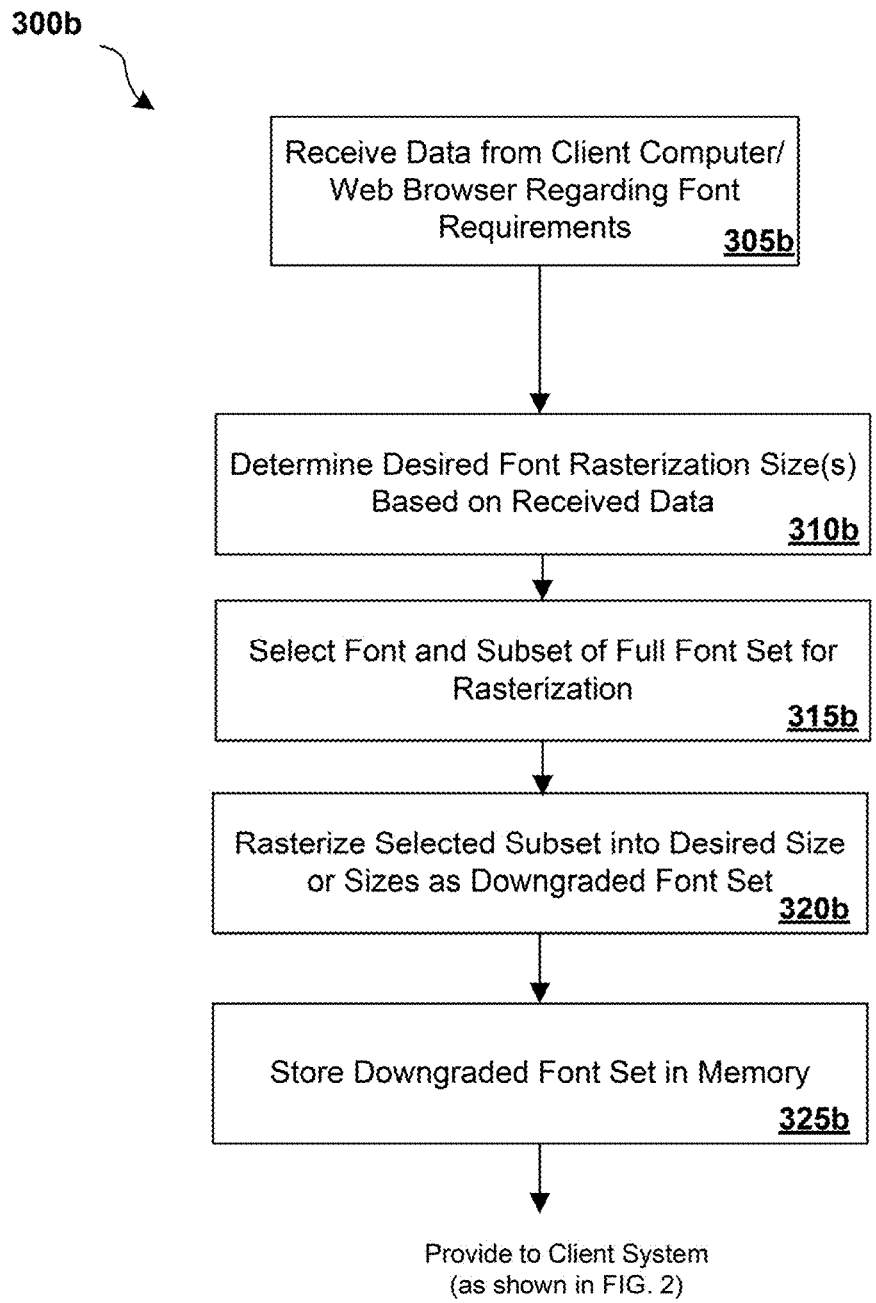
FIG. 3B is an illustration of an embodiment of dynamic downgraded font generation in accordance with aspects of the present invention.
Figure 3C:
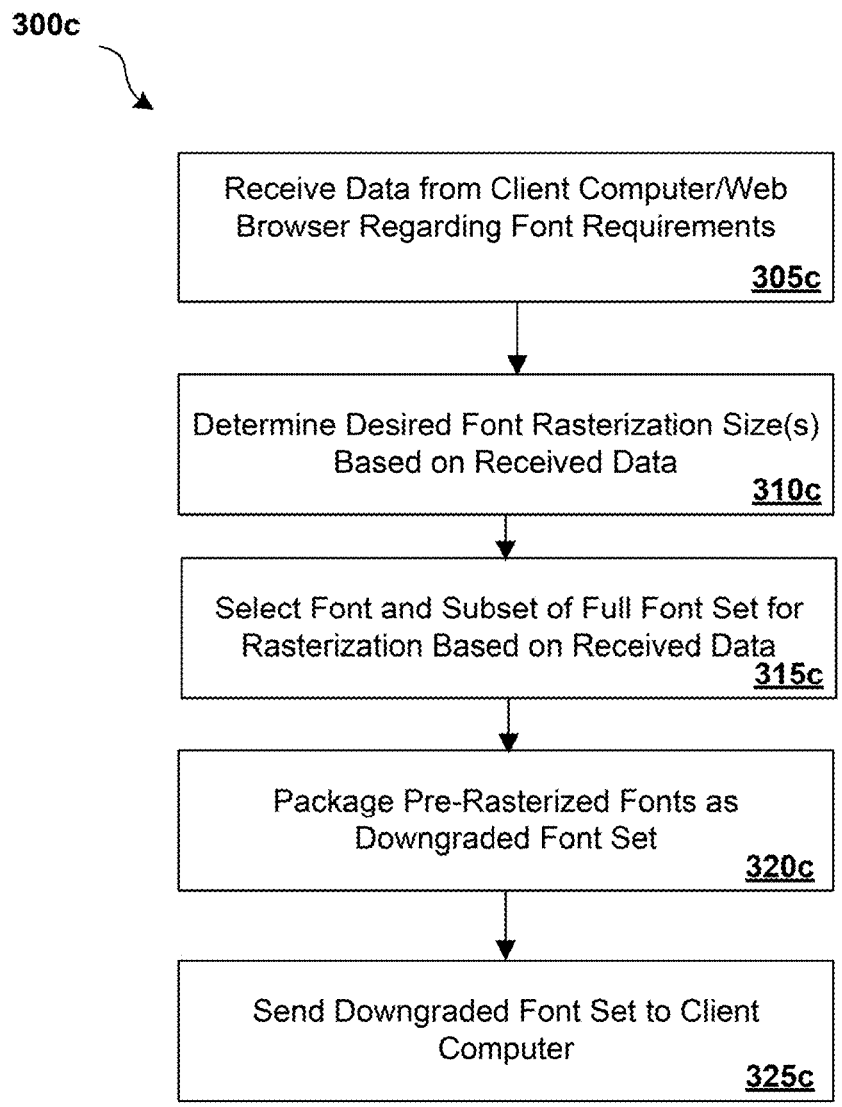
FIG. 3C is an illustration of an embodiment of dynamic downgraded font generation in accordance with aspects of the present invention.

FIG. 3B illustrates an alternate embodiment of a process 300b for dynamic font generation. In this implementation, specific data is received from the client system application, such as the web browser or browser like application, at stage 305 regarding font requirements. This data may include browser configuration requirements, display size or other display characteristics, VDP data, such as relative font sizes or other data associated with the display requirements or capabilities of the client system and/or the VDP print job. Based on this data, desired font rasterization sizes to generate and/or select the downgraded font sets is determined at stage 310b, along with selection of the appropriate font type and subset at stage 315b. At stage 320b, the selected font sets are then rasterized to the desired sizes (or loaded from the database if the selected characters of the font have already been rasterized). At stage 325b, the downgraded fonts are then stored in a memory, such as database 108a as shown in FIG. 1B. The fonts may also be provided to the client system as shown in FIG. 2.

Figure 4:
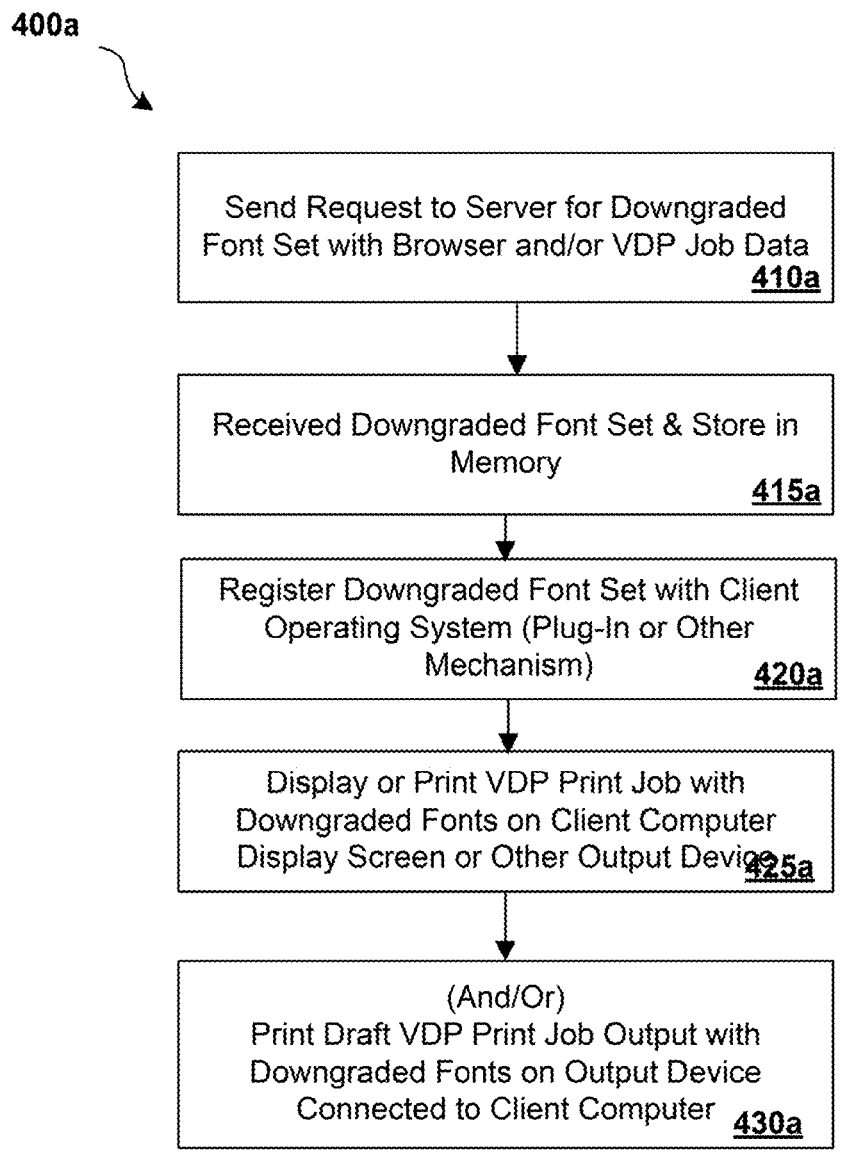
FIG. 4 is an illustration of an embodiment of Client-side downgraded font provisioning in accordance with aspects of the present invention.

Attention is now directed to FIG. 4 which illustrates details of an embodiment of client-side downgraded font provisioning in accordance with aspects of the present invention. As shown in FIG. 4, a client-side application on a client system (such as Client System 150a as shown in FIG. 1A) such as a web browser (i.e., browser module 122b of FIG. 1C) or browser like application may initiate the request for a downgraded font set at stage 410a. Alternately, this functionality may be initiated automatically based on user access to the server system through the web browser, or via other mechanisms. In any case, the server system, such as Server System 110 shown in FIG. 1A, then generates and/or selects a downgraded font set in response to the request (previously described) and sends the set to the client system, where it is then stored in memory at stage 415a. In addition, the downgraded font set is typically registered with the client system operating system or browser or application program at stage 420a so that it can be used for the limited purposes of display in the composition application and/or printing draft output. After registration, the downgraded font set can then be used by the composition application at stage 425a, with the downgraded fonts rendered into the print job display as displayed on the display device, such as device 140 of FIG. 1C, of the client system. Optionally, in some embodiments, the downgraded fonts may be used for draft printing or other limited display or printing functionality on the client system at stage 430a.

Figure 5:
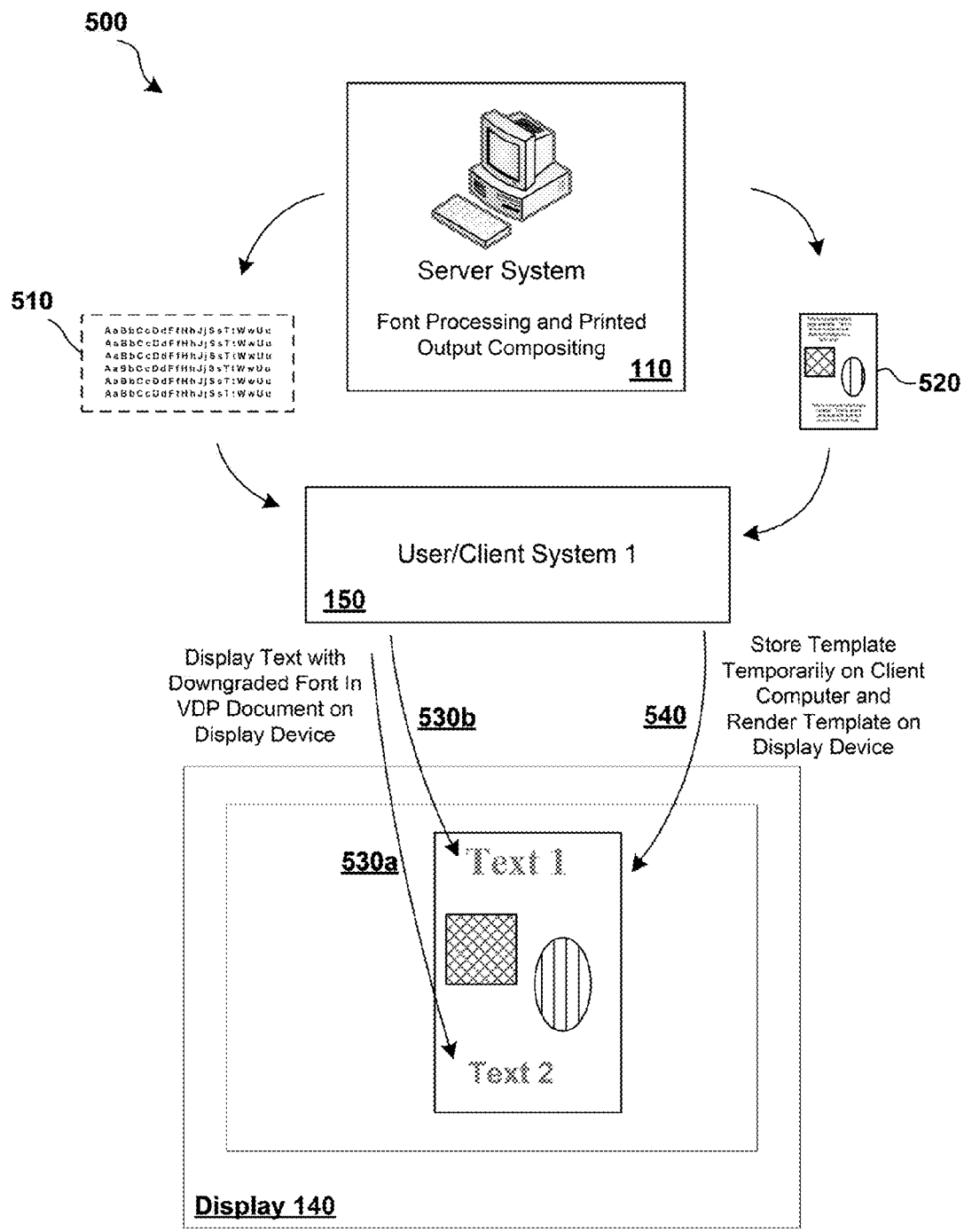
FIG. 5 is an illustration of integration of downgraded fonts into a VDP composition in accordance with aspects of the present invention.

FIG. 5 illustrates additional details of use of downgraded font sets for rendering (i.e., displaying) on the display of a client system. As shown in FIG. 5, a server system such as Server System 110 of FIG. 1A may generate and/or provide, in response to input from a client system, such as Client Systems 150a-n of FIG. 1A, one or more VDP templates 520, with the templates including data, images, text, objects or other content associated with a VDP print job, along with one or more downgraded font sets 510. As noted previously herein, downgraded font sets 510 include a subset of a full font set, typically rasterized into one or more sizes and including either a full set of characters or a subset of characters for providing limited font functionality. As an example, font set 510 may include uppercase characters of the full TrueType Times New Roman font set (or other subsets) rendered in two (or other numbers of) different sizes. It is apparent that a wide variety of other downgraded font sets 510 are also possible.

Upon receipt at the client system, the downgraded fonts are stored in memory and then registered with the client system operating system, a browser executing on the client system, and/or with a browser-like application executing on the client system so that they can used to render output on a display device of the client system. When a user selects a particular block of text (such as blocks Text 1 and Text 2 shown in FIG. 5), the text may be incorporated as displayed or printed output 530a and 530b using the downgraded fonts, and placed into the template 540 as displayed on the display (or printing) device 140. Consequently, the rendered display shows the VDP print job in a WYSIWIG-like format, without the need for downloading or using a full vector font library to generate the displayed output. Similarly, draft printed output may also be rendered by generating draft printed output on an printer in a corresponding fashion using the downgraded fonts.

It is noted that in various embodiments the present invention may relate to processes such as are described or illustrated herein. These processes are typically implemented in one or more modules as are described herein, and such modules may include computer software stored on a computer readable medium including instructions configured to be executed by one or more processors. It is further noted that, while the processes described and illustrated herein may include particular stages, it is apparent that other processes including fewer, more, or different stages than those described and shown are also within the spirit and scope of the present invention. Accordingly, the processes shown herein are provided for purposes of illustration, not limitation.

As noted, some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler or other machine code generation mechanisms, scripting programs, PostScripts programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, some embodiments of the invention may be implemented using assembly language, Java, C, C#, C++, scripting languages, and/or other programming languages and software development tools as are known or developed in the art. Other embodiments of the invention may be implemented in hard-wired circuitry in place of, or in combination with, machine-executable software instructions.

As described herein, memory or computer memory may include one or more types of physical memory storage devices including RAM, DRAM, SRAM, Flash, magnetic memory such as hard disks, optical disks, or other devices capable of storing data in a digital format. In addition, any describe memory may include one or more distinct physical memory spaces on one or more computer systems or external data storage devices or systems.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method, comprising:
    storing, on a server system, an electronic document template including font requirements;
    receiving, from a client system, a request to display a document associated with the electronic document template;
    generating, at the server system, a bitmap font set based on (1) a vector font set and (2) the font requirements, the vector font set including a set of vector font characters, each character from the set of vector font characters being a vector font character, the downgraded font set including a set of bitmap font characters, each character from the set of bitmap font characters being a bitmap font character generated from a corresponding vector font character from the set of vector font characters; and
    sending, to the client system, the electronic document template and a portion of the bitmap font set such that the client system renders a preview of the document that (1) is based on the electronic document template and (2) includes client data rendered using characters from the set of bitmap font characters.

2. The method of claim 1, further comprising receiving, from the client system, an indication of a selection of the electronic document template from a plurality of electronic document templates.

3. The method of claim 1, wherein the portion of the bitmap font set is a subset of characters from the set of bitmap font characters.

4. The method of claim 1, further comprising, receiving, from the client system request to modify a layout of the electronic document template, the request configured to modify the font requirements.

5. The method of claim 4, further comprising:
    generating, at the server system, a modified electronic document template and modified bitmap font set; and
    sending, to the client system, the modified electronic document template and a portion of the modified bitmap font set such that the client system renders a second preview of the document that is based on the modified electronic document template and the modified bitmap font set.

6. The method of claim 1, further comprising, composing, at the server system, a print job based on the electronic document template and using the vector font set.

7. A method, comprising:
    sending, to a server system, a request to display a document associated with an electronic document template that is stored at the server system, the electronic document template including font requirements;
    receiving, from the server system, a bitmap font set based on (1) a vector font set and (2) the font requirements, the vector font set including a set of vector font characters, each character from the set of vector font characters being a vector font character, the bitmap font set including a set of bitmap font characters, each character from the set of bitmap font characters being a bitmap font character generated from a corresponding vector font character from the set of vector font characters;
    receiving, from the server system, the electronic document template and a portion of the bitmap font set; and
    display a preview of a document that is that (1) is based on the electronic document template and (2) includes client data rendered using characters from the set of bitmap font characters.

8. The method of claim 7, wherein the font requirement include at least one of one or more of a font type, a font size, a subset of characters and symbols of a vector font set and a font format.

9. The method of claim 7, wherein the bitmap font set is a first bitmap font set, further comprising:
    sending, to the server system, data associated with a change to the font requirements; and
    receiving, from the server system, a second bitmap font set based on the vector font set and the change to the font requirements.

10. The method of claim 9, wherein the preview is a first preview, the method further comprising display a second preview of the document using the second bitmap font set.

11. The method of claim 7, further comprising receiving, from the server system, data defining a user interface to facilitate editing of the document based on the electronic document template.

12. The method of claim 7, further comprising sending, to the server system, an indication of a selection of the electronic document template from a plurality of electronic document templates.

13. The method of claim 7, wherein the portion of the bitmap font set is a subset of characters from the set of bitmap font characters.

14. A non-transitory processor-readable medium storing code representing instructions. the code comprising code to cause a processor to:

> store, on a server system, an electronic document template including font requirements;
>
> receive, from a client system, a request to display a document associated with the electronic document template;
>
> generate, at the server system, a bitmap font set based on (1) a vector font set and (2) the font requirements, the vector font set including a set of vector font characters, each character from the first set of characters being a vector font character, the bitmap font set including a set of bitmap font characters, each character from the set of bitmap font characters being a bitmap font character generated from a corresponding vector font character from the set of vector font characters; and
>
> send, to the client system, the electronic document template and a portion of the bitmap font set such that the client system renders a preview of the document that (1) is based on the electronic document template and (2) includes client data rendered using characters from the set of bitmap font characters.

15. The non-transitory processor-readable medium storing code representing instructions of claim 14, the code further comprising code to cause the process to receive, from the client system, an indication of a selection of the electronic document template from a plurality of electronic document templates.

16. The non-transitory processor-readable medium storing code representing instructions of claim 14, wherein the portion of the bitmap font set is a subset of characters from the set of bitmap font characters.

17. The non-transitory processor-readable medium storing code representing instructions of claim 14, the code further comprising code to cause the process to receive, from the client system request to modify a layout of the electronic document template, the request configured to modify the font requirements.

18. The non-transitory processor-readable medium storing code representing instructions of claim 14, wherein the font requirement include at least one of one or more of a font type, a font size, a subset of characters and symbols of a vector font set and a font format.

19. The non-transitory processor-readable medium storing code representing instructions of claim 14, the code further comprising code to cause the process to compose, at the server system, a print job based on the electronic document template and using the vector font set.

* * * * *